United States Patent
Kim et al.

(10) Patent No.: US 7,974,011 B2
(45) Date of Patent: Jul. 5, 2011

(54) DUAL PRISM SHEET, BACKLIGHT ASSEMBLY HAVING THE SAME AND METHOD THEREOF

(75) Inventors: Hyoung-Joo Kim, Euiwang-si (KR); In-Sun Hwang, Suwon-si (KR); Heu-Gon Kim, Suwon-si (KR); Sung-Kyu Shim, Seoul (KR); Taek-Sun Shin, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/829,166

(22) Filed: Jul. 27, 2007

(65) Prior Publication Data

US 2008/0025042 A1    Jan. 31, 2008

(30) Foreign Application Priority Data

Jul. 27, 2006    (KR) .................. 10-2006-0070509

(51) Int. Cl.
G02B 5/02    (2006.01)
(52) U.S. Cl. ..................... 359/599; 359/619; 349/64
(58) Field of Classification Search .................. 362/606, 362/607, 610, 618, 624, 620, 626, 627; 349/64, 349/112; 359/599, 619
See application file for complete search history.

(56) References Cited

U.S. PATENT DOCUMENTS

| | | | | |
|---|---|---|---|---|
| 5,748,828 A | * | 5/1998 | Steiner et al. | 385/146 |
| 6,406,158 B1 | * | 6/2002 | Ohkawa | 362/625 |
| 7,085,060 B2 | * | 8/2006 | Matsushita et al. | 359/599 |
| 7,530,721 B2 | * | 5/2009 | Mi et al. | 362/606 |
| 2004/0105157 A1 | * | 6/2004 | Matsushita et al. | 359/584 |
| 2005/0190575 A1 | * | 9/2005 | Hayakawa | 362/615 |
| 2006/0291248 A1 | * | 12/2006 | Yu | 362/615 |

FOREIGN PATENT DOCUMENTS

| | | |
|---|---|---|
| JP | 2001143515 | 5/2001 |
| JP | 2004126016 | 4/2004 |
| JP | 2005-107020 A | 4/2005 |
| KR | 1020010048770 | 6/2001 |

* cited by examiner

Primary Examiner — John A Ward
(74) Attorney, Agent, or Firm — Cantor Colburn LLP

(57) ABSTRACT

A dual prism sheet includes a base film, upper prisms formed on an upper surface of the base film and lower prisms formed on a lower surface of the base film. A cross-section of the upper and lower prisms is formed as an isosceles triangular shape having a base and a vertex angle, and a phase of the upper prisms is delayed between about 0 and about 0.5 times of a prism pitch with respect to a phase of the lower prisms.

7 Claims, 9 Drawing Sheets

DUAL PRISM SHEET, BACKLIGHT ASSEMBLY HAVING THE SAME AND METHOD THEREOF

This application claims priority to Korean Patent Application No. 2006-70509, filed on Jul. 27, 2006 and all the benefits accruing therefrom under 35 U.S.C. §119, the contents of which are herein incorporated by reference in its entirety.

BACKGROUND OF THE INVENTION

1. Field of the Invention

The present invention relates to a dual prism sheet and a backlight assembly having the dual prism sheet. More particularly, the present invention relates to a dual prism sheet capable of refracting incident light in a vertical direction having the dual prism sheet.

2. Description of the Related Art

A liquid crystal display ("LCD") apparatus includes a liquid crystal material between an array substrate and a color filter substrate. The liquid crystal material controls an amount of light incident into a substrate, and images are displayed. The LCD apparatus requires a light source for displaying the images.

An LCD apparatus is a non-emissive type LCD apparatus that uses light in order to display images. Thus, the LCD apparatus requires a backlight assembly that provides the liquid crystal display panel with the light. The backlight assembly for the LCD apparatus is classified into a direct illumination type and an edge illumination type in accordance with a position of the light source. A lamp is disposed at a rear surface of the LCD apparatus and emits the light directly toward the LCD panel in the direct illumination type. In the edge illumination type, a lamp is disposed at sides of a light guide plate ("LGP") and emits the light toward the LGP, and the light provided from the light source is incident into the LCD panel through the LGP.

In the edge illumination type, the light provided from the lamp of the backlight assembly is guided by the LGP, and passes through a prism sheet on the LGP to improve a vertical incidence of the light. Thus, the light is supplied to the LCD panel. The prism sheet guides the light from the LGP in the vertical direction with respect to the LCD panel. Various prism sheets have been developed for guiding light in a vertical direction. However, the luminance in the vertical direction is restricted, so that the luminance of the LCD apparatus is decreased.

BRIEF SUMMARY OF THE INVENTION

An exemplary embodiment provides a dual prism sheet guiding incident light in a vertical direction with respect to a liquid crystal display panel.

An exemplary embodiment provides a backlight assembly including the dual prism sheet.

An exemplary embodiment provides a dual prism sheet including a base film, upper prisms formed on an upper surface of the base film and lower prisms formed on a lower surface of the base film. A cross-section of each of the upper and lower prisms is formed as an isosceles triangular shape having a base and a vertex angle. A phase of the upper prisms is delayed between 0 to about 0.5 times of a prism pitch with respect to a phase of the lower prisms.

In an exemplary embodiment, a vertex angle of each of the upper and lower prisms may be between about 83 degrees and about 88 degrees.

In an exemplary embodiment, a vertex angle of each of the upper and lower prisms may be about 86 degrees.

In an exemplary embodiment, the phase of the upper prisms is delayed between about D and about D+0.5 times of the prism pitch with respect to the phase of the lower prisms, $$D = \frac{H}{\tan\left(180° - \frac{3}{2}\alpha + \sin\left(\frac{\sin(\frac{\alpha}{2} + \theta - 90°)}{n}\right)\right)} * \frac{1}{P},$$

wherein H is a thickness of the base film, and $\alpha$ is a vertex angle of each of the upper and lower prisms, n is a refractive index of the dual prism sheet, $\theta$ is a mean angle of an incident light with respect to the base film and P is a pitch of each of the upper and lower prisms.

In an exemplary embodiment, a sum of a prism height of each of the upper prisms and a thickness of the base film may be between about 90 microns (μm) and about 175 microns (μm).

An exemplary embodiment provides a dual prism sheet including a base film, upper prisms formed on an upper surface of the base film, and lower prisms formed on a lower surface of the base film extended in substantially the same direction as the upper prisms. A cross-section of each of the lower prisms is formed as an isosceles triangular shape. A cross-section of each of the upper prisms is formed as a right-angled triangular shape.

In an exemplary embodiment, a gradient of an inclined surface of each of the upper prisms is substantially the same as a gradient of the inclined surface of each of the lower prisms.

In an exemplary embodiment, vertex angles of the lower prisms may be about 86 degrees.

An exemplary embodiment provides a backlight assembly including a light source, a light guide plate guiding the light generated in the light source towards an upper direction, and a dual prism sheet. The dual prism sheet includes a base film, upper prisms and lower prisms substantially parallel with an incident side of the light guide plate facing the light source. A cross-section of the upper and lower prisms is formed as an isosceles triangular shape having a base and a vertex angle. A phase of the upper prisms is delayed between about 0 and about 0.5 times of a prism pitch with respect to a phase of the lower prisms.

In an exemplary embodiment, a vertex angle of each of the upper and lower prisms may be about 86 degrees.

In an exemplary embodiment, the phase of the upper prisms is delayed between about D and about D+0.5 times of the prism pitch with respect to the phase of the lower prisms;

$$D = \frac{H}{\tan\left(180° - \frac{3}{2}\alpha + \sin\left(\frac{\sin(\frac{\alpha}{2} + \theta - 90°)}{n}\right)\right)} * \frac{1}{P}$$

wherein H is a thickness of the base film, $\alpha$ is a vertex angle of each of the upper and lower prisms, n is a refractive index of the dual prism sheet, $\theta$ is a mean angle of an incident light with respect to the base film and P is a pitch of the upper and lower prisms.

In an exemplary embodiment, a sum of a prism height of each of the upper prisms and a thickness of the base film may be between about 90 μm to about 175 μm.

An exemplary embodiment provides a backlight assembly including a light source, a light guide plate guiding the light generated from the light source toward a front direction, and a dual prism sheet. The dual prism sheet includes a base film, upper prisms and lower prisms that are extended substantially in parallel with an incident side of the light guide plate facing the light source. A cross-section of each of the lower prisms is formed as an isosceles triangular shape. A cross-section of each of the upper prisms is formed as a right-angled triangular shape. A vertical surface of the right-angled triangular shape faces the light source.

In an exemplary embodiment, a gradient of an inclined surface of each of the upper prisms is substantially same as a gradient of inclined surface of each of the lower prisms. Moreover, a vertex angle of each of the lower prisms of the optical sheet may be about 86 degrees.

An exemplary embodiment of a method of forming a backlight assembly including a dual prism sheet, includes forming the dual prism sheet including upper prisms and lower prisms extending substantially parallel with each other with respect to an incident surface of the light guide plate facing the light source, a cross-section of each of the upper and lower prisms having an isosceles triangular shape having a base and a vertex angle that are substantially equal to each other, disposing a light source generating light at an incident surface of a light guide plate, and disposing the dual prism sheet facing a light exiting surface of the light guide plate. Forming the dual prism sheet includes delaying a phase of the upper prisms between 0 and about 0.5 times of a prism pitch with respect to a phase of the lower prisms.

An exemplary embodiment of a method of forming a backlight assembly including a dual prism sheet, includes forming the dual prism sheet including upper prisms and lower prisms extending substantially parallel with each other with respect to an incident surface of a light guide plate facing a light source, a cross-section of each of the lower prisms having an isosceles triangular shape, a cross-section of each of the upper prisms having a right-angled triangular shape, a vertical side of the right-angled triangular shape substantially facing the light source, disposing the light source generating light facing the incident surface of a light guide plate, and disposing the dual prism sheet facing a light exiting surface of the light guide plate.

An exemplary embodiment provides that even though the phase difference between the upper prisms and the lower prisms may occur, such as in a manufacturing process, optical characteristics of the dual prism sheet are improved. Therefore, the luminance of the backlight assembly in the vertical direction is increased, so that the luminance of the LCD apparatus is improved.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
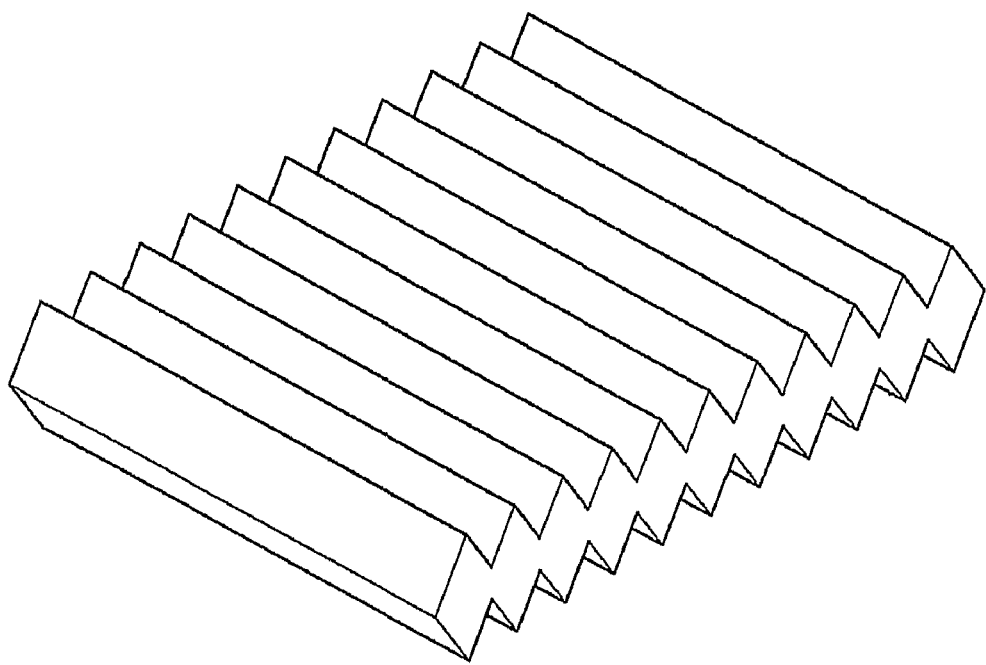
FIG. 1 is a perspective view illustrating an exemplary embodiment of a dual prism sheet in accordance with the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" another element or layer, it can be directly on the other element or layer or intervening elements or layers may be present. In contrast, when an element is referred to as being "directly on" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
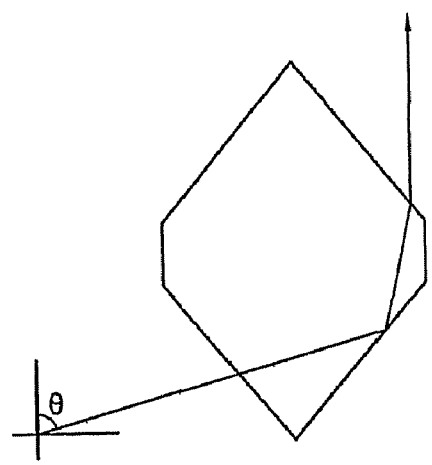
FIG. 2 is a cross-sectional view illustrating the dual prism sheet in FIG. 1.

FIG. 1 is a perspective view illustrating an exemplary embodiment of a dual prism sheet in accordance with the present invention. FIG. 2 is a cross-sectional view illustrating the dual prism sheet in FIG. 1.

Referring to FIGS. 1 and 2, a dual prism sheet guides light provided by a light guide plate ("LGP") in a vertical direction with respect to a liquid crystal display ("LCD") panel. As illustrated in FIGS. 1 and 2, prisms of both surfaces have substantially the same phase.

In manufacturing the prisms of both surfaces at substantially the same phase, various technical difficulties still exist. Thickness of a base of the dual prism sheet has great influence on a function of the dual prism sheet.

Figure 3:
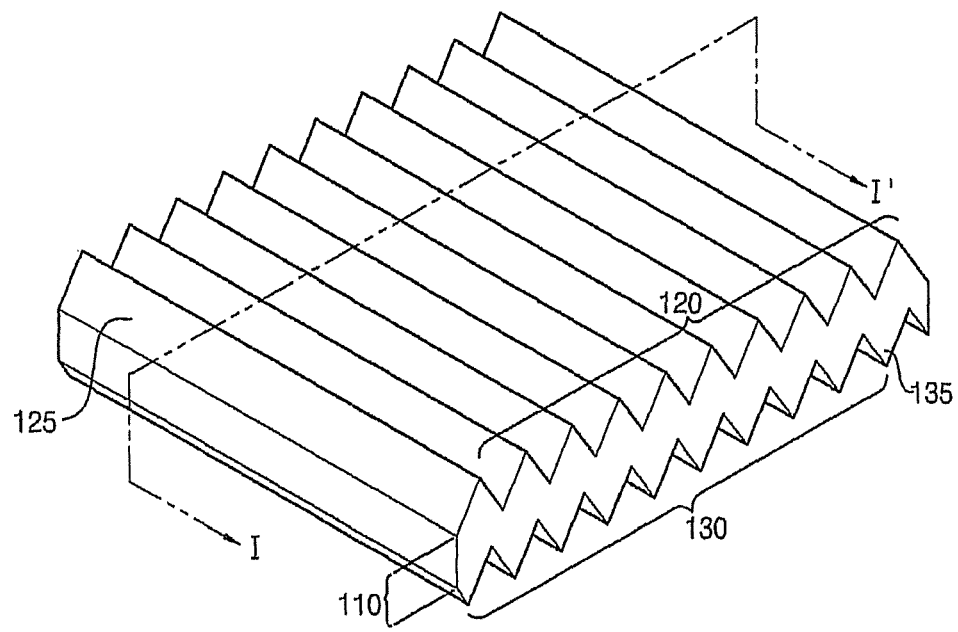
FIG. 3 is a perspective view illustrating another exemplary embodiment of a dual prism sheet in accordance with the present invention.

FIG. 3 is a perspective view illustrating another exemplary embodiment of a dual prism sheet in accordance with the present invention.

Referring to FIG. 3, a prism sheet 100 includes upper prisms 120, a base film 110 and lower prisms 130. The upper prisms 120 are formed on a front surface of the base film 110, and the lower prisms 130 are formed on a rear surface of the base film 110.

The base film 110 is formed substantially as a plate shape having a thickness, and the upper prisms 120 are formed on the front surface of the base film 110. The upper prisms 120 are formed and extend substantially parallel with a surface, e.g., the front surface, of the base film 110 adjacent to a light source. The upper prisms 120 include a plurality of upper unit prisms 125 formed and extending substantially parallel with each other.

The lower prisms 130 are formed and extend substantially parallel with the surface of the base film 110 and the upper prisms 120. The lower prisms 130 include a plurality of lower unit prisms 135. The upper prisms 120 and the lower prisms 130 are arranged in a direction (e.g., transverse) substantially perpendicular to a longitudinal direction of the upper prisms 120 and the lower prisms 130. The upper prisms 120 and the lower prisms 130 may be arranged alternately with each other along a transverse direction.

Figure 4:
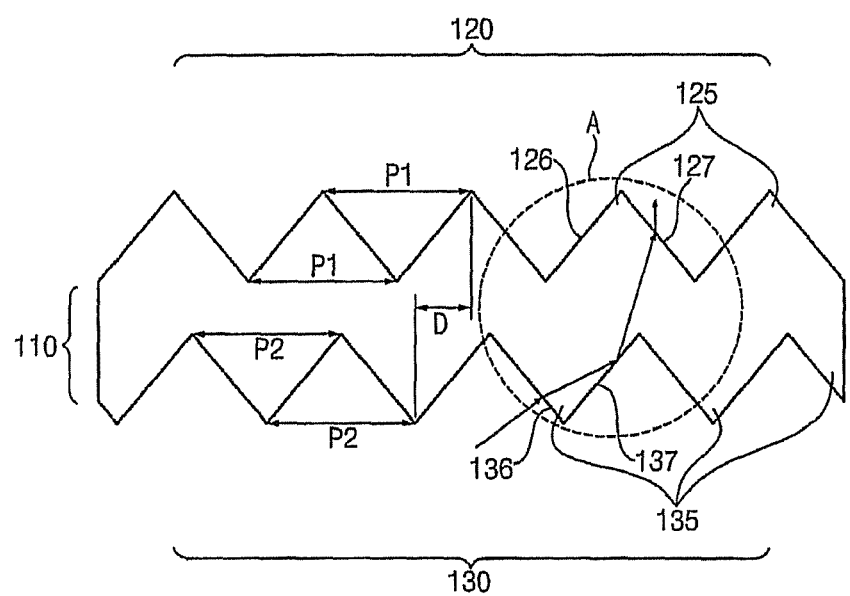
FIG. 4 is a cross-sectional view of the dual prism sheet taken along line I-I' in FIG. 3.

FIG. 4 is a cross-sectional view of the dual prism sheet taken along line I-I' in FIG. 3.

Referring to FIGS. 3 and 4, the upper prisms 120 are formed on the front surface of the base film 110, and the lower prisms 130 are formed on the rear surface of the base film 110. A first pitch P1 of the upper prisms 120 is defined as a distance between adjacent crests of the upper unit prisms 125 or a distance between adjacent troughs of the upper unit prisms 125. A second pitch P2 of the lower prisms 130 is defined as a distance between adjacent crests of the lower unit prisms 135 or a distance between adjacent troughs of the lower unit prisms 135. In one exemplary embodiment, a sum of a prism height (e.g., vertical distance from apex to base) of each of the upper prisms and a thickness of the base film (e.g., in a vertical direction) is between about 90 microns ($\mu$m) and about 175 ($\mu$m).

The first pitch P1 of the upper prisms 120 is substantially the same as the second pitch P2 of the lower prisms 130. Thus, light passing through a first point of the lower unit prism 135 may pass through a second point of the upper unit prism 125. The first point of the lower unit prism 135 may always correspond to the second point of the upper unit prism 125. Therefore, light refraction may be uniform throughout the dual prism sheet.

Moreover, a phase difference D is defined as a shortest horizontal distance from a center of the lower unit prism 135 to a center of the upper unit prism 125 in a opposite direction to the light source. A ratio of the first pitch P1 or the second pitch P2 over the phase difference between the upper prisms 120 and the lower prisms 130 of the present embodiment may be between about 0 to about 0.5. For example, when the phase difference D is about zero, a structure of a dual prism sheet may be substantially the same as the dual prism sheet in FIG. 1.

As in the illustrated embodiment, a surface of the upper unit prism 125 adjacent to (e.g., facing) the light source may be an upper front prism surface 126. A surface of the upper unit prism 125 opposite to (e.g., facing away from) the light source may be an upper rear prism surface 127. A surface of the lower unit prism 135 adjacent to (e.g., facing) the light source may be a lower front prism surface 136. A surface of the lower unit prism 135 opposite to (e.g., facing away from) the light source may be a lower rear prism surface 137.

The light refracted at the LGP is refracted in an inclined direction with respect to a surface of the base film 110. An exemplary embodiment of the light is illustrated in FIG. 4 with an arrow incident onto the labeled lower front prism surface 136. A majority of the light refracted at the LGP is incident into the lower unit prism 135 through the lower front prism surface 136 of the lower unit prism 135. The light incident into the lower unit prism 135 is refracted at the lower front prism surface 136. The light incident into the lower unit prism 135 is totally reflected from the lower rear prism surface 137. The totally reflected light is guided toward the upper prisms 120.

The refracted light passes through the upper front prism surface 126 or the upper rear prism surface 127 of the upper unit prism 125. When the refracted light passes through the upper front prism surface 126, the refracted light may be derailed. The refracted light at the lower prisms 130 may pass through the upper rear prism surface 127 to be refracted substantially toward the vertical direction with respect to the LCD panel that is on the dual prism sheet 100. As illustrated in FIG. 4, the light incident into the lower unit prism 135 through the lower front prism surface 136 is totally reflected at the lower rear prism surface 137. The totally reflected light is refracted at the upper rear prism surface 127 to be refracted in the vertical direction with respect to the LCD panel.

An exemplary embodiment of a ratio of the first pitch P1 to the phase difference between the upper and lower prisms 120 and 130 may be between about 0 to about 0.5. Alternatively, a ratio of the second pitch P2 to the phase difference between the upper and lower prisms 120 and 130 may be between about 0 to about 0.5.

Figure 5:
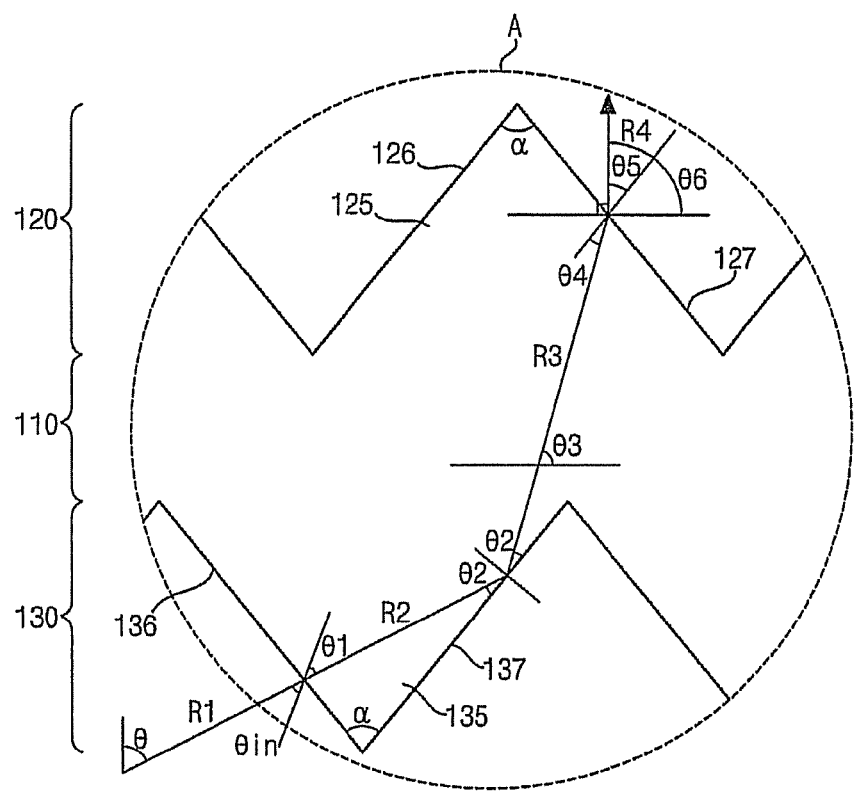
FIG. 5 is an enlarged cross-sectional view illustrating portion 'A' of FIG. 4.

FIG. 5 is an enlarged cross-sectional view illustrating portion 'A' of FIG. 4.

Referring to FIG. 5, in a dual prism optical sheet, a cross-section of each of the upper and lower prisms 120 and 130 may have a substantially isosceles triangular cross-section having a vertex angle α.

A first light R1 guided by the LGP enters the lower prism 130 at an angle θ with respect to a vertical line. The first light R1 enters the lower prism 130 through the lower front prism surface 136, and an incident angle $\theta_{in}$ satisfies the following Equation 1.

$$\theta_{in} = \frac{\alpha}{2} + \theta - 90° \qquad \text{<Equation 1>}$$

wherein θ is an incident angle with respect to the vertical direction of the dual prism sheet 100, and α is a vertex angle of the upper and lower unit prisms 125 and 135. In the illustrated embodiment, the vertex angles α of the upper and lower unit prisms 125 and 135 are substantially the same.

When light entering into a material having a refractive index n from outside having a refractive index 1 satisfies Snell's equation, $\sin(\theta_1) = n \sin(\theta_2)$. A second light R2 refracted at the lower front prism surface 136 at the angle $\theta_1$, satisfies the following Equation 2.

$$\theta_1 = \sin^{-1}\left(\frac{\sin\theta_{in}}{n}\right) \qquad \text{<Equation 2>}$$

wherein n is a refractive index of the dual prism sheet 100.

The second light R2 is totally reflected at the lower rear prism surface 137. An incident angle $\theta_2$ at which the second light R2 enters the lower rear prism surface 137, satisfies the following Equation 3.

$$\theta_2 = 90° - \alpha + \theta_1 \qquad \text{<Equation 3>}$$

The second light R2 is totally reflected, and is reflected at substantially the same angle as the incident angle. A third light R3 is reflected from the lower rear prism surface 137, and guided toward the upper prism 120. An angle $\theta_3$ of the third light R3 with respect to the base film (e.g., a horizontal line) satisfies the following Equation 4.

$$\theta_3 = \theta_2 + 90° - \alpha/2 \qquad \text{<Equation 4>}$$

The third light R3 enters the upper rear prism surface 127, and an incident angle $\theta_4$ of the third light R3 satisfies the following Equation 5.

$$\theta_4 = 90° - \alpha + \theta_2 \qquad \text{<Equation 5>}$$

The third light R3 is refracted at the upper rear prism surface 127, and an angle $\theta_5$ at which a fourth light R4 exits from the upper rear prism surface 127, satisfies the following Equation 6.

$$\theta_5 = \sin^{-1}(n \sin \theta_4) \qquad \text{<Equation 6>}$$

Moreover, an angle $\theta_6$ is an angle of the fourth light R4 with respect to the base film 110. The angle $\theta_6$ satisfies the following Equation 7.

$$\theta_6 = \theta_5 + \frac{\alpha}{2} \qquad \text{<Equation 7>}$$

The dual prism sheet 100 guides the first light R1 substantially in the vertical direction with respect to the LCD display panel. Thus, the fourth light R4 which is the last light exiting the dual prism sheet 100, may exit at an angle of about 90 degrees with respect to the base film 110, e.g., perpendicular to an upper and/or lower surface of the base film 100. Therefore, the angle $\theta_6$ may be about 90 degrees. When the angle $\theta_6$ is about 90 degrees, the following Equation 8 may be obtained by eliminating each $\theta_1$, $\theta_2$, $\theta_3$ and $\theta_4$.

$$90° = \frac{\alpha}{2} + \sin^{-1}\left(n\sin\left(180° - 2\alpha + \sin^{-1}\left(\frac{\sin(\frac{\alpha}{2} + \theta - 90°)}{n}\right)\right)\right) \qquad \text{<Equation 8>}$$

wherein θ is an incident angle of the first light R1, and n is a refractive index of the dual prism sheet, and α is a vertex angle of the cross-section of each of the upper and lower prisms 120 and 130.

For example, when incident light has an incident angle between 74 degrees and 79 degrees and enters the dual prism sheet having a refractive index n of about 1.52, the vertex angle α is between about 83 degrees and about 88 degrees, experimentally. In one exemplary embodiment, the vertex angle α may be about 86 degrees.

Figure 6:
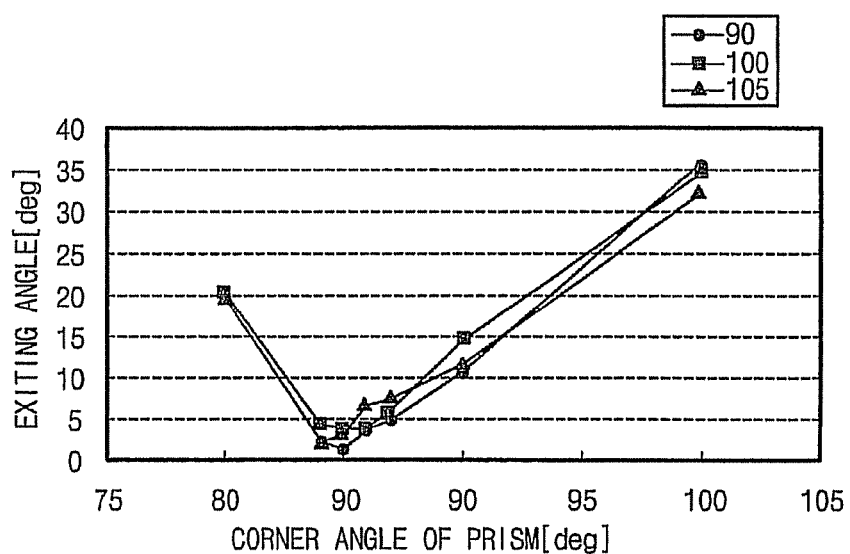
FIG. 6 is a graph illustrating an exemplary embodiment of a distribution of an exiting angle according to a vertex angle.

FIG. 6 is a graph illustrating a distribution of an exiting angle according to a vertex angle.

Referring to FIG. 6, a dual prism sheet in FIG. 6 includes upper and lower prisms having substantially the same vertex angle. A graph in FIG. 6 illustrates a distribution of the exiting angle according to the vertex angle of prisms when an incident angle is about 90 degrees (e.g., line --●--), about 100 degrees (e.g., line --■--) and about 105 degrees (e.g., line --▲--). In exemplary embodiments, the vertex angle of the prisms having the lowest exiting angle regardless of the incident angles may be about 85 degrees.

Figure 7A:
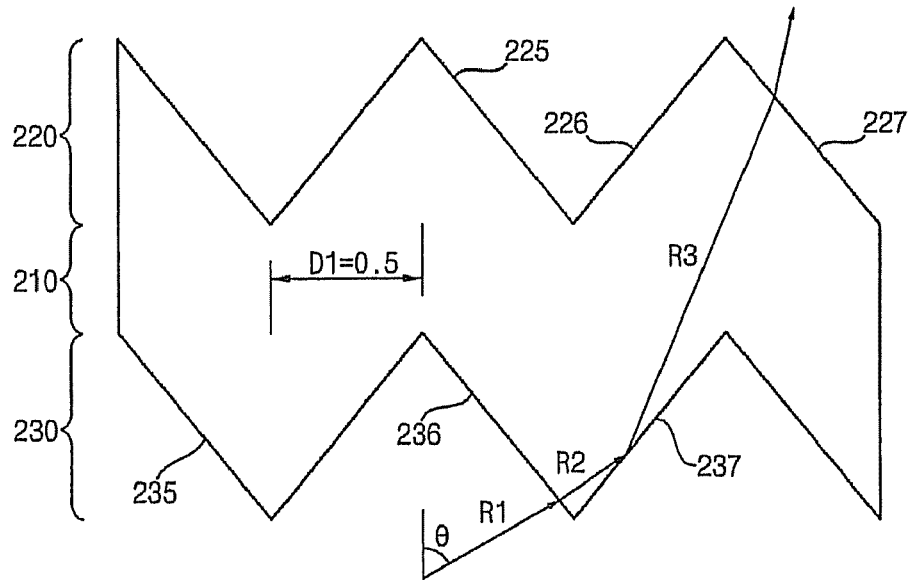
FIGS. 7A to 7C are cross-sectional views illustrating light exiting courses according to phase differences of dual prism sheets in accordance with exemplary embodiments of the present invention.
Figure 7B:
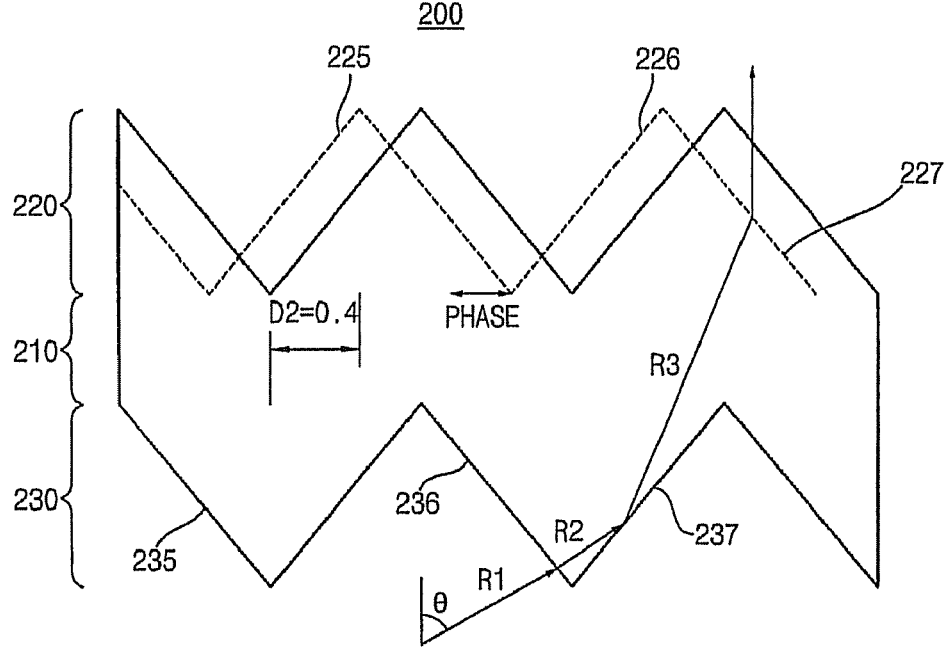
Figure 7C:
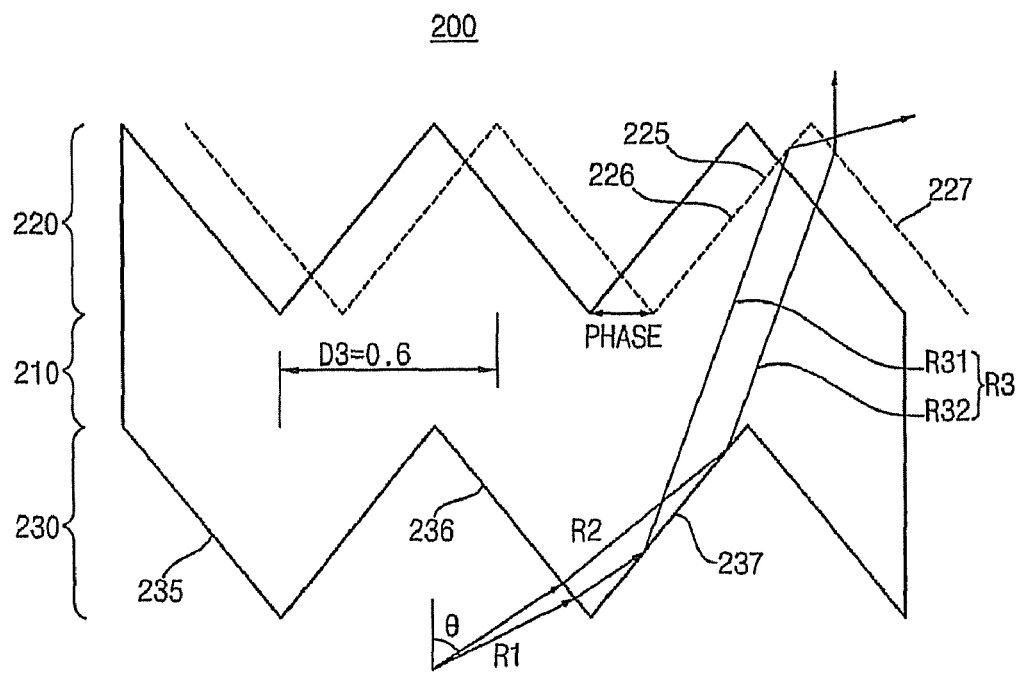

FIGS. 7A to 7C are cross-sectional views illustrating light exiting courses according to phase differences of dual prism sheets in accordance with exemplary embodiments of the present invention.

FIG. 7A is a cross-sectional view illustrating a light exiting course when a phase difference D1 is about 0.5 times of a prism pitch. The dual prism sheet 200 includes a base film 210, upper prisms 220 and lower prisms 230. The upper prisms 220 include a plurality of upper unit prisms 225, and the lower prisms 230 include a plurality of lower unit prisms 235.

An upper front prism surface 226 of the upper unit prism 225 is adjacent to (e.g., facing) the light source, and an upper rear prism surface 227 of the upper unit prism 225 is opposite to the light source. A lower front prism surface 236 of the lower unit prism 235 is adjacent to (e.g., facing) the light source, and a lower rear prism surface 237 of the lower unit prism 235 is opposite to the light source.

A phase difference D1 from a center of the lower unit prism 235 of the lower prisms 230 to a center of the upper unit prism 225 of the upper prisms 220 in an opposite direction to the light source is about 0.5 times of the pitch of the upper and lower prisms 220 and 230.

A first light R1 and a second light R2 are guided in substantially the same light exiting course as in the prism sheet of FIG. 5, and the repetitive explanation will be omitted. A third light R3 is refracted at the upper rear prism surface 227. The third light R3 enters the upper rear prism surface 227, and is refracted in a direction substantially parallel with a vertical direction with respect to a surface of the prism sheet 200.

FIG. 7B is a cross-sectional view illustrating a light exiting course when a phase difference D2 is about 0.4 times of a prism pitch. A phase difference D2 is about 0.4 times of the pitch of the upper and lower prisms 220 and 230, as illustrated by the dotted line. The phase difference is defined as a distance from a center of the lower unit prism 235 to a center of the upper unit prism 225 in an opposite direction to the light source.

A first light R1 and a second light R2 are guided in substantially the same light exiting course as the prism sheet of FIG. 5, and the repetitive explanation will be omitted. A third light R3 is refracted at the upper rear prism surface 227. The third light R3 enters the upper rear prism surface 227, and is refracted in a direction substantially parallel with a vertical direction with respect to a surface of the prism sheet 200.

In the illustrated embodiment, the phase difference of the upper prisms 220 is moved by about 0.1 times of the pitch of the prism. However, the third light R3 is still refracted at the upper rear prism surface 227.

FIG. 7C is a cross-sectional view illustrating a light exiting path when a phase difference D3 is about 0.6 times of a prism pitch. A phase difference D3 is about 0.6 times of the pitch of the upper and lower prisms 220 and 230, as illustrated by the dotted line. The phase difference D3 is defined as a distance from a center of the lower unit prism 235 to a center of the upper unit prism 225 in an opposite direction to the light source.

A first light R1 and a second light R2 are guided in substantially the same light exiting course as the prism sheet of FIG. 5, and the repetitive explanation will be omitted. The third light R3 includes a maximum angle third light R31 and a minimum angle third light R32. The maximum angle third light R31 enters the lower prism 230 at a maximum incident angle, and is refracted and totally reflected in the prism sheet. The minimum angle third light R32 enters the lower prism 230 at a minimum incident angle, and is refracted and totally reflected in the prism sheet.

When the phase difference D3 is about 0.6 times of the prism pitch, the maximum angle third light R31 is guided toward the upper front prism surface 226. When the maximum angle third light R31 enters the upper front prism surface 226, the maximum angle third light R31 is totally reflected from the upper front prism surface 226.

The maximum angle third light R31 enters the upper rear prism surface 227 after the total reflection at the upper front prism surface 226. An incident angle at the upper front prism surface 226 is much smaller than the minimum angle third light R32, so that the maximum angle third light R31 is not totally reflected, but refracted at the upper rear surface 227. The maximum angle third light R31 does not exit in a vertical direction with respect to the dual prism sheet 200. However, the maximum angle third light R31 exits in a direction forming an angle with respect to the vertical direction of the upper rear prism surface 227. Thus, the light guided in the vertical direction with respect to the dual prism sheet 200 is decreased.

Figure 8:
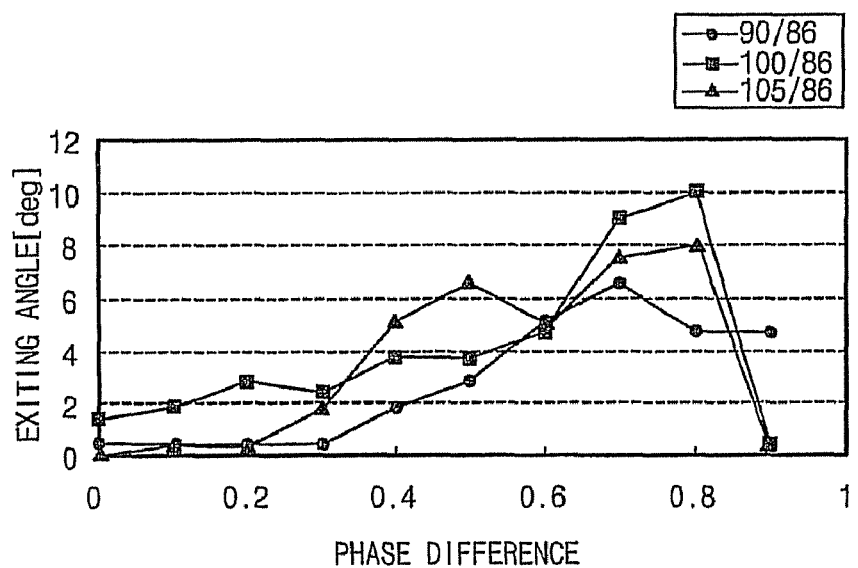
FIG. 8 is a graph showing an exemplary embodiment of a distribution of an exiting angle according to a phase difference.

FIG. 8 is a graph showing a distribution of an exiting angle according to a phase difference.

Referring to FIGS. 7 and 8, the exiting angle is increased according to the phase difference regardless of incident angles. A phase difference range between about 0.6 and about 0.8 is substantially the same as a phase difference range between about 0.4 and about 0.2. Because the third light R3 does not enter the upper rear prism surface 227 but enters the upper front prism surface 226, the phase difference range between about 0.6 and about 0.8 is different from the phase difference range between about 0.4 and about 0.2.

Figure 9:
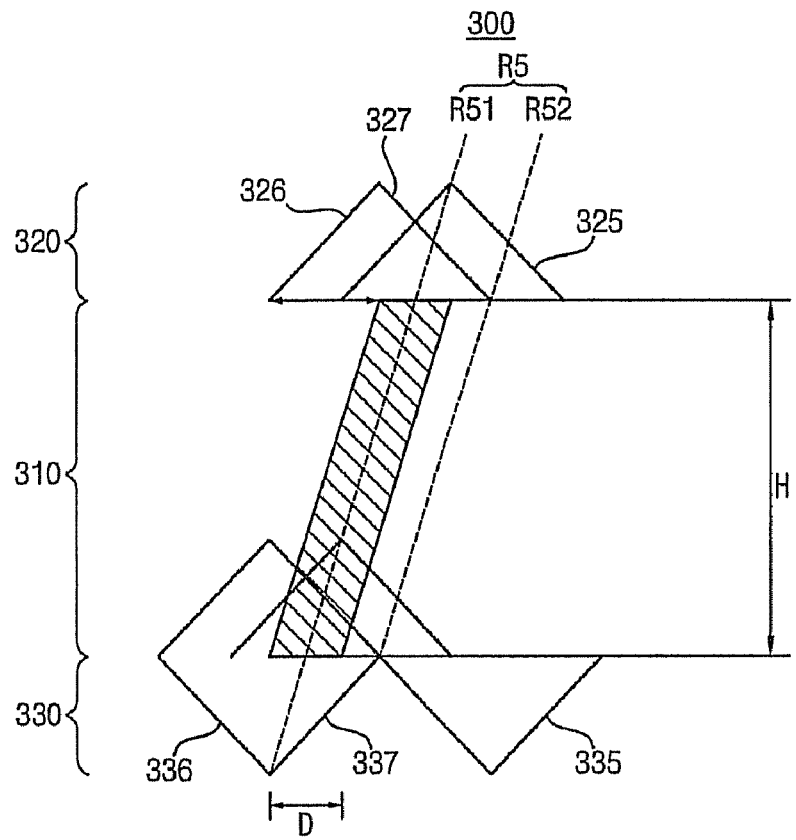
FIG. 9 is a cross-sectional view illustrating an exemplary embodiment of a position of a prism according to a thickness of a base film and a phase difference of a dual prism sheet in accordance with the present invention.

FIG. 9 is a cross-sectional view illustrating an exemplary embodiment of a position of a prism according to a thickness of a base film and a phase difference of a dual prism sheet in accordance with the present invention.

Referring to FIG. 9, a dual prism sheet 300 includes a base film 310, upper prisms 320 and lower prisms 330. The upper prisms 320 include a plurality of upper unit prisms 325, and the lower prisms 330 include a plurality of lower unit prisms 335.

The upper unit prism 325 includes an upper front prism surface 326 and an upper rear prism surface 327, and the lower unit prism 335 includes a lower front prism surface 336 and a lower rear prism surface 337. A fifth light R5 includes a front surface fifth light R51 and a rear surface fifth light R52. The fifth light R5 enters and is refracted at the lower front prism surface 336, and is totally reflected at the lower rear prism surface 337. The totally reflected fifth light R5 passes through the dual prism sheet 300.

FIG. 9 is a cross-sectional view illustrating a relative position of the upper unit prism 325 with respect to the lower unit prism 335 to satisfy a condition that the fifth light R5 passes through the upper rear prism surface 327.

The fifth light R5 is guided toward the upper prisms 320 with a constant inclined angle as indicated by the dotted lines. An allowable range (e.g., indicated by the patterned section) of the fifth light R5 for passing through the upper rear prism surface 327 depends on a thickness of the base film 310. The light passing through the dual prism sheet 300 is guided in substantially the same light exiting course as in the prism sheet of FIG. 5. Thus, an angle $\theta_5$ of the fifth light R5 with respect to the base film 310 is substantially the same as the angle $\theta_3$ of the third light R3 with respect to the base film 210 in FIG. 5.

A vertex angle of each of the upper and lower unit prisms 325 and 335 is α, and a refractive index of the dual prism sheet 300 is n. An angle of an incident light incident into the lower front prism surface 336 of the dual prism sheet 300 with respect to a normal surface of the prism sheet 300 is θ. α, n and θ satisfy the following Equation 9.

$$\theta_5 = 180° - \frac{3}{2}\alpha + \sin^{-1}\left(\frac{\sin(\frac{\alpha}{2}+\theta-90°)}{n}\right) \qquad < \text{Equation 9} >$$

The incident angle may have a range between a maximum incident angle and a minimum incident angle. However, the range of the incident angle may be no more than about 5 degrees, and a mean value of the maximum incident angle and the minimum incident angle may be used. Thus, a mean gradient of the fifth light R5 is tan $\theta_5$.

When a thickness H of the base film is changed, the phase difference range is changed. In an exemplary embodiment, when H is zero, the phase difference range may be between about 0 and about 0.5. Alternatively, the phase difference range may be between about L and about L+0.5, when the thickness H is changed. Here, L satisfies an equation which is $$L = \frac{\tan\theta_5}{H}.$$

When the phase difference range is between about L and about L+0.5, the front surface fifth light R51 and the rear surface fifth light R52 pass through the upper rear prism surface 327. Thus, all of the incident lights R51 and R52 may be guided in a vertical direction.

Figure 10:
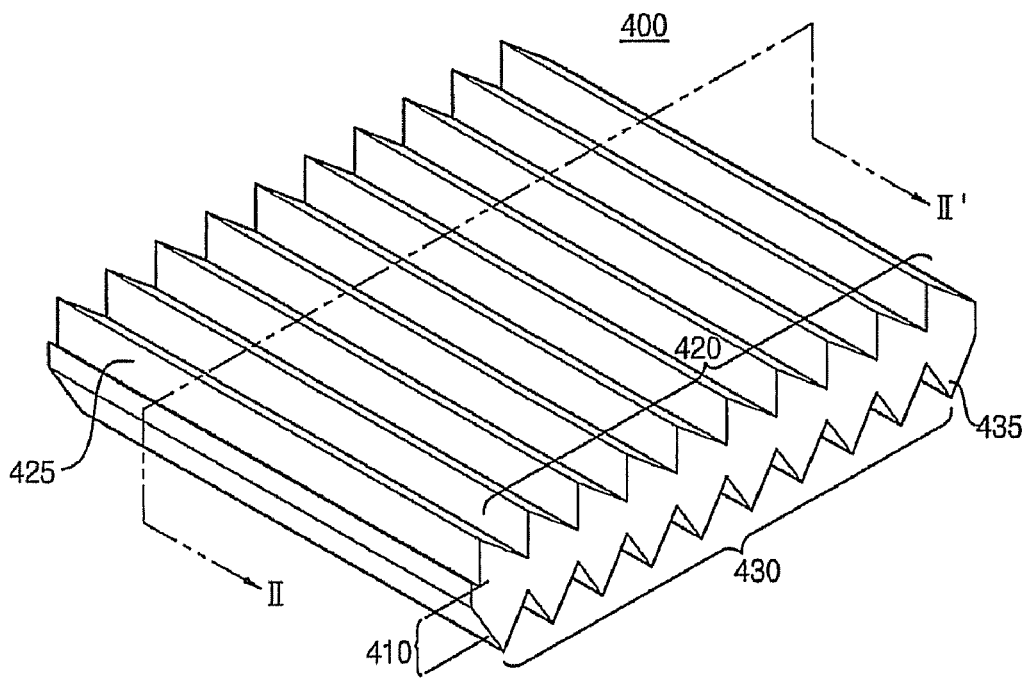
FIG. 10 is a perspective view of another exemplary embodiment of a dual prism sheet in accordance with the present invention.
Figure 11:
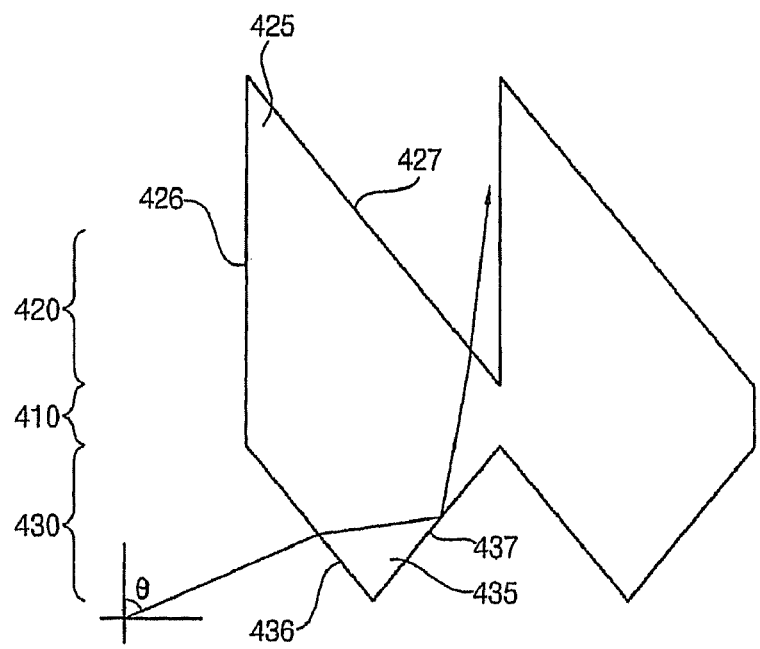
FIG. 11 is a cross-sectional view of the dual prism sheet taken along line II-II' in FIG. 10.

FIG. 10 is a perspective view of another exemplary embodiment of a dual prism sheet in accordance with the present invention. FIG. 11 is a cross-sectional view of the dual prism sheet taken along line II-II' in FIG. 10.

Referring to FIGS. 10 and 11, the dual prism sheet 400 includes a base film 410, upper prisms 420 and lower prisms 430. The upper prisms 420 include a plurality of upper unit prisms 425, and the lower prisms 430 include a plurality of lower unit prisms 435. Vertexes of the upper prisms 420 and the lower prisms 435 do not coincide along a vertical direction.

The upper unit prism 425 includes an upper front prism surface 426 and an upper rear prism surface 427, and the lower unit prism 435 includes a lower front prism surface 436 and a lower rear prism surface 437.

As in the illustrated embodiment, the upper unit prism 425 of the dual prism sheet 400 is formed as a right-angled triangular shape in a cross-sectional view. The lower unit prism 435 is formed as an isosceles triangular shape in a cross-sectional view (FIG. 11).

The upper front prism surface 426 of the upper unit prism 425 is formed in a vertical direction with respect to the base film 410 (e.g., an upper surface thereof). The rear prism surface 427 is formed in an inclined direction with respect to the base film 410 (e.g., the upper surface thereof). The lower front prism surface 436 and the lower rear prism surface 437 of the lower unit prism 435 are formed as an isosceles triangular shape in a cross-sectional view. In this configuration, the lower front prism surface 436 and the lower rear prism surface 437 are opposite to each other, and have substantially the same inclining gradients.

A vertex angle of the upper unit prism 425 is half value of the vertex angle α of the lower unit prism 435. Thus, the gradient of the upper rear prism surface 427 may be substantially the same as the lower front prism surface 436 and the lower rear prism surface 437.

Therefore, the dual prism sheet 400 in accordance with the present embodiment is substantially the same structure as the dual prism sheet 100 in FIGS. 3 and 4 except the upper front prism surface 126. Because only the upper rear prism surface 427 is formed to be inclined on the upper prisms 420, abnormal refraction does not occur. The gradient of the upper rear prism surface 427 of the upper unit prism 425 is substantially the same as the gradient of the lower front prism surface 436 and the lower rear prism surface 437. Even though the upper prisms 420 are formed at any pitch and any phase difference, the dual prism sheet including the upper prisms 420 may guide light in substantially the vertical direction with respect to the dual prism sheet 420, as illustrated by the arrow in FIG. 11.

Figure 12:
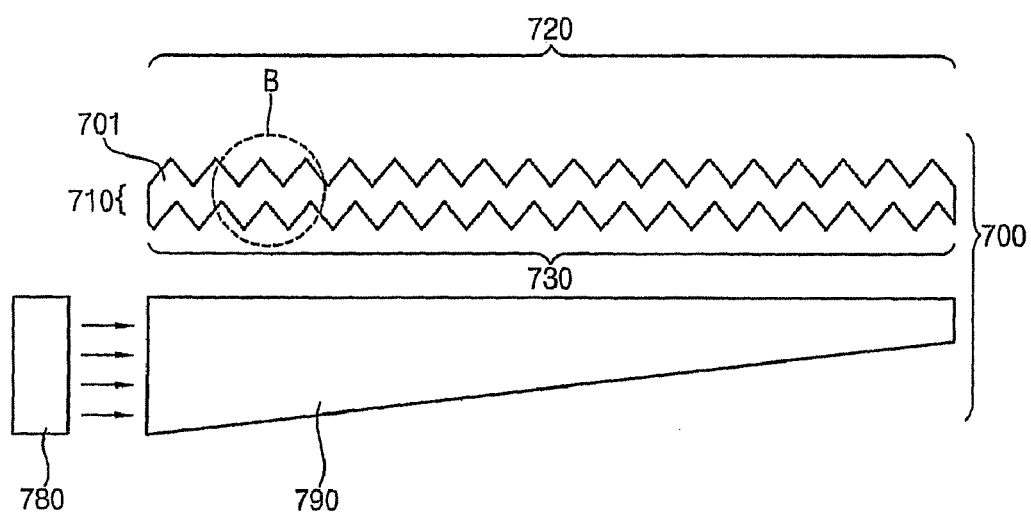
FIG. 12 is a perspective view illustrating another exemplary embodiment of a backlight assembly having a dual prism sheet in accordance with the present invention.
Figure 13:
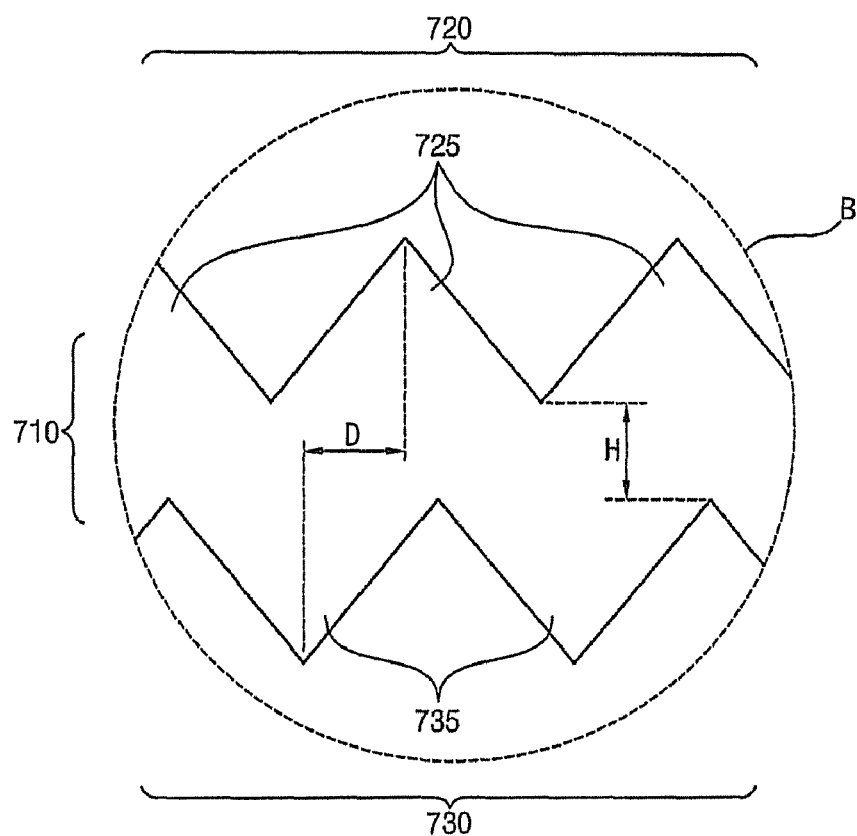
FIG. 13 is an enlarged cross-sectional view illustrating the dual prism sheet in FIG. 12.

FIG. 12 is a perspective view illustrating an exemplary embodiment of a backlight assembly having a dual prism sheet in accordance with the present invention. FIG. 13 is an enlarged cross-sectional view illustrating the dual prism sheet in FIG. 12.

Referring to FIGS. 12 and 13, a backlight assembly 700 in accordance with the present embodiment includes a light source 780, a light guide plate ("LGP") 790 and a dual prism sheet 701. The dual prism sheet 701 includes a base film 710, upper prisms 720 and lower prisms 730, the upper prisms 720 include a plurality of upper unit prisms 725, and the lower prisms 730 include a plurality of lower unit prisms 735.

Light generated in the light source 780 enters the LGP 790, and is guided toward a front surface of the LGP 790 (e.g., an upper light exiting surface). The LGP 790 does not guide the light in a vertical direction with respect to the LGP 790, and the dual prism sheet 701 is required to guide the light toward the vertical direction.

The light enters the dual prism sheet 701 from the LGP 790 in an inclined direction. The dual prism sheet 701 guides the light in substantially the vertical direction with respect to the dual prism sheet 701. A phase difference D is defined as a shortest horizontal distance from a center of the lower unit prism 735 to a center of the upper unit prism 725 of the dual prism sheet 701 in an opposite direction to the light source. A ratio of a pitch P1 of the upper unit prism 725 over the phase difference D between the upper prisms 720 and the lower prisms 730 of the present embodiment may be between about 0 and about 0.5.

The phase difference D is changed according to a thickness H of the base film, as explained in FIG. 9. The phase difference range may be between about L to about L+0.5, and satisfies the following Equation 10 and Equation 11.

$$\theta_5 = 180° - \frac{3}{2}\alpha + \sin^{-1}\left(\frac{\sin(\frac{\alpha}{2}+\theta-90°)}{n}\right) \qquad < \text{Equation 10} >$$

$$L = \frac{\tan\theta_5}{H} * \frac{1}{P} \qquad < \text{Equation 11} >$$

wherein n is a refractive index of the dual prism sheet, and α is a vertex angle of the upper and lower unit prisms 725 and 745. θ is a mean incident angle.

Figure 14:
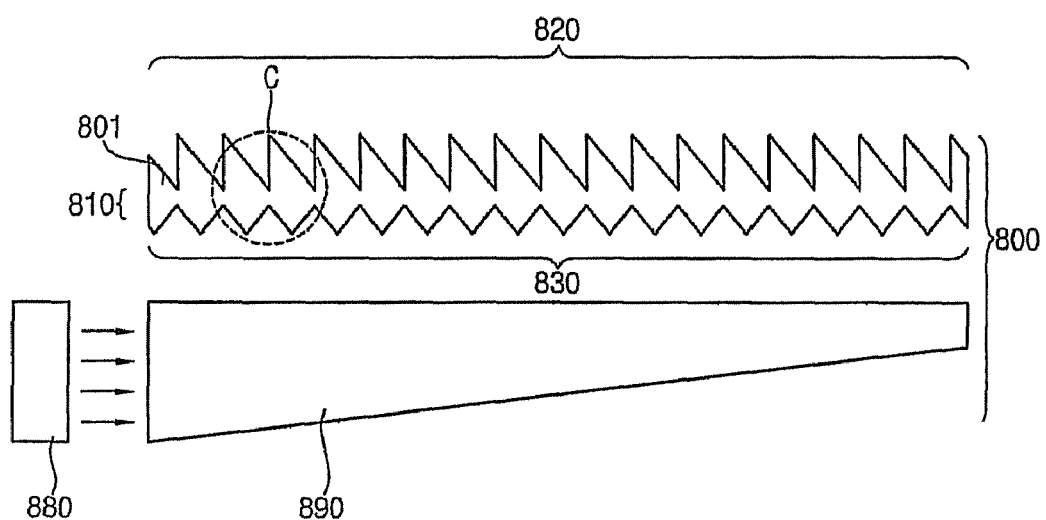
FIG. 14 is a perspective view illustrating another exemplary embodiment of a backlight assembly having a dual prism sheet in accordance with the present invention.
Figure 15:
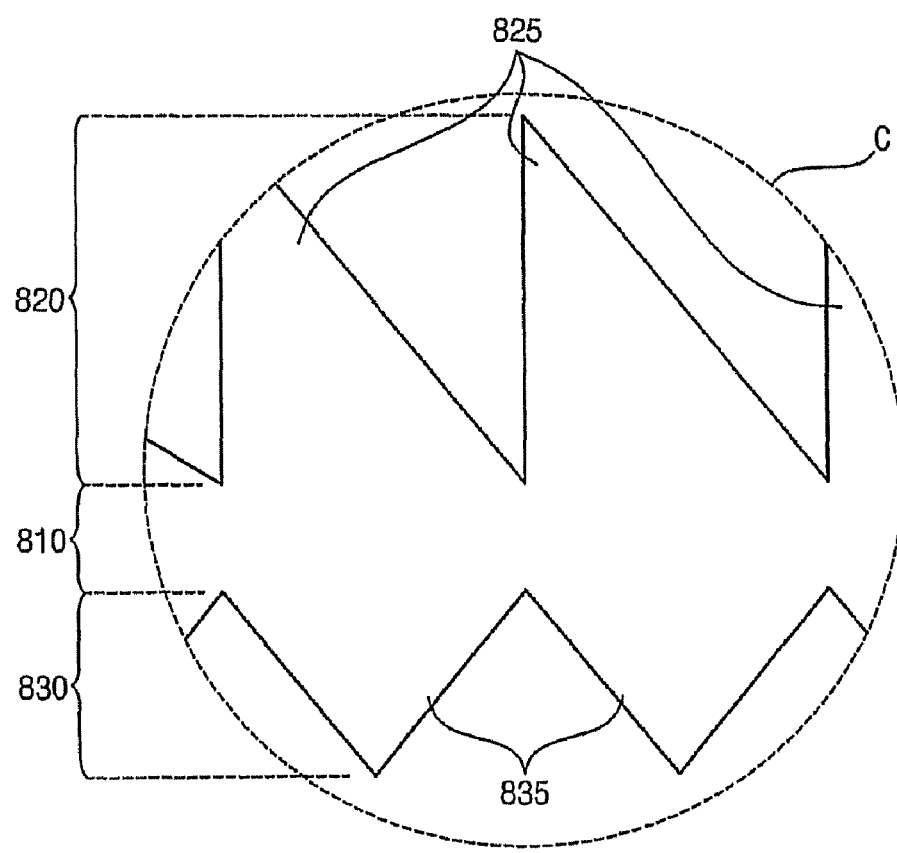
FIG. 15 is an enlarged cross-sectional view illustrating the dual prism sheet in FIG. 14.

FIG. 14 is a perspective view illustrating another exemplary embodiment of a backlight assembly having a dual prism sheet in accordance with the present invention. FIG. 15 is an enlarged cross-sectional view illustrating the dual prism sheet in FIG. 14.

Referring to FIGS. 14 and 15, a backlight assembly 800 in accordance with the present embodiment includes a light source 880, a light guide plate 890 and a dual prism sheet 801. The dual prism sheet 801 includes a base film 810, upper prisms 820 and lower prisms 830. The upper prisms 820 include a plurality of upper unit prisms 825, and the lower prisms 830 include a plurality of lower unit prisms 835.

Light generated from the light source 880 enters the LGP 890 at a light incident surface, and is guided toward an upper light exiting surface of the LGP 890. The LGP 890 does not guide the light in a vertical direction with respect to the LGP 890, and the dual prism sheet 801 is required to guide the light toward the vertical direction. The light enters the dual prism sheet 801 from the LGP 890 in an inclined direction with respect to the vertical direction. The dual prism sheet 801 guides the light in substantially the vertical direction with respect to the dual prism sheet 801.

The upper unit prism 825 of the dual prism sheet 801 in accordance with the present embodiment is formed as a right-angled triangular shape in a cross-sectional view, such as illustrated in FIGS. 10 and 11. The upper front prism surface of the upper unit prism 825 is formed in a direction substantially parallel with the vertical direction with respect to the dual prism sheet 801. The rear prism surface of the upper unit prism 825 is formed in an inclined direction with respect to the dual prism sheet 801.

The lower unit prism 835 is formed as an isosceles triangular shape in a cross-sectional view. A vertex angle of the upper unit prism 825 has half the value of the vertex angle α of the lower unit prism 835. Even though the upper unit prism 835 is formed at any pitch and any phase difference, the dual prism sheet may guide light in the vertical direction with respect to the dual prism sheet 801.

As in the illustrated embodiments, even though the phase difference between the upper prisms and the lower prisms may occur, such as in a manufacturing process, optical characteristics of the dual prism sheet are improved. In addition, the thickness of the base film has a significant influence on the phase difference range, such that the phase difference range is increased as the thickness of the base film is increased.

As in the illustrated embodiments, when the upper prisms are formed as a right-angled triangular shape in a cross-sectional view, the refracted light in the lower prisms does not pass through the vertical surface of the upper prisms. The reflected light in the lower prisms passes through the inclined surface of the upper prisms. Even though the upper unit prism is formed at an of a number of pitches and any of a number of phase differences, the dual prism sheet may guide the light in the vertical direction with respect to the dual prism sheet.

Advantageously, the luminance of the backlight assembly in the vertical direction is increased, so that the luminance of the LCD apparatus is improved.

Those skilled in this art will appreciate that many modifications, substitutions and variations can be made in and to the materials, apparatus, configurations and methods of the display panels of the present invention without departing from its spirit and scope. In light of this, the scope of the present invention should not be limited to that of the particular embodiments illustrated and described herein, as they are only exemplary in nature, but instead, should be fully commensurate with that of the claims appended hereafter and their functional equivalents.

What is claimed is:

1. A dual prism sheet comprising:
   a base film;
   upper prisms on an entire upper surface of the base film, a cross-section of each of the upper prisms being formed as an isosceles triangular shape; and
   lower prisms on an entire lower surface of the base film, a cross-section of each of the lower prisms having an isosceles triangular shape having the substantially same base vertex angle with the upper prisms, such that two sides of the cross-section, which are extended from the lower surface of the base film, have a substantially same length, a phase of the upper prisms being different from a phase of the lower prisms.

2. The dual prism sheet of claim 1, wherein the phase of the upper prisms is delayed between 0 and about 0.5 times of the prism pitch with respect to the phase of the lower prisms.

3. The dual prism sheet of claim 1, wherein the upper prisms extend substantially parallel with the lower prisms.

4. The dual prism sheet of claim 1, wherein the vertex angle of each of the upper and lower prisms is between about 83 degrees and about 88 degrees.

5. The dual prism sheet of claim 1, wherein the vertex angle of each of the upper and lower prisms is about 86 degrees.

6. The dual prism sheet of claim 1, wherein the phase of the upper prisms is delayed between about D and about D+0.5 times of the prism pitch with respect to the phase of the lower prisms, wherein D is expressed as follows $$D = \frac{H}{\tan\left(180° - \frac{3}{2}\alpha + \sin\left(\frac{\sin(\frac{\alpha}{2} + \theta - 90°)}{n}\right)\right)} * \frac{1}{P},$$

wherein H is a thickness of the base film, α is a vertex angle of each of the upper and lower prisms, n is a refractive index of the dual prism sheet, and θ is a mean angle of an incident light with respect to the base film, and P is a pitch of each of the upper and lower prisms.

7. The dual prism sheet of claim 1, wherein a sum of a prism height of each of the upper prisms and a thickness of the base film is between about 90 microns (μm) to about 175 microns (μm).

* * * * *